Patented Aug. 1, 1933

1,920,426

UNITED STATES PATENT OFFICE 1,920,426

VAT DYESTUFFS OF THE PYRAZOLANTHRONE SERIES AND PROCESS OF MAKING THEM

Paul Nawiasky and Artur Krause, Ludwigshafen-on-the-Rhine, Germany, assignors to General Aniline Works, Inc., New York, N. Y., a Corporation of Delaware No Drawing. Original application December 21, 1926, Serial No. 156,256. Divided and this application November 25, 1927, Serial No. 235,750, and in Germany December 22, 1925

8 Claims. (Cl. 260—45)

This application for patent is for subject matter which has been removed from the application for patent Ser. No. 156,256 filed December 21st, 1926 matured into U. S. Patent No. 1,766,719 with the express intention of making this divisional application.

In the German patent No. 255,641 there is described a process for the production of yellow vat dyestuffs of the anthraquinone series which consists in heating pyrazolanthrone with caustic alkalis. It has also been stated in the U. S. Patent No. 1,329,435 that these yellow vat dyestuffs can be transformed, by treatment with alkylating agents, into new vat dyestuffs which generally produce red dyeings.

In the parent application a process is described for converting the said pyrazolanthrones employed for the process of the German Patent No. 255,641 into alkylation products.

We have now found that these alkylation products are converted into vat dyestuffs dyeing from yellow to red shades by treatment with alkaline condensing agents.

The treatment of the said alkylation products with alkaline condensing agents may be carried out in any known or suitable manner. For example it may be effected by heating with alcoholic caustic potash. Another very suitable method is the treatment with metal arylides such as sodium anilide in the manner described in the U. S. application for patent by Arthur Luettringhaus and Hugo Wolff for an improvement in the production of isodibenzanthrones, Ser. No. 62,933, filed October 16th, 1925, matured into U. S. Patent No. 1,725,590.

The dyestuffs obtained from alkylene-di-pyrazolanthrones dye from yellow to orange shades, while those obtained from alkyl-pyrazolanthrones produce more or less red dyeings.

The following examples further illustrate how the invention may be carried out in practice, but the invention is not restricted thereto. The parts are by weight.

Example 1

1 part of pyrazolanthrone is heated for several hours with 1 part of sodium carbonate and 1 part of the methyl ester of toluene sulfonic acid, in 30 parts of trichlorbenzene, whereupon the latter is expelled by steam distillation, 2.5 parts of the product thus obtained or more suitably of that obtainable in accordance with Example 3 of the parent specification are introduced into a melt of alcoholic potash prepared by heating 12.5 parts of caustic potash with 10 parts of ethyl alcohol at 120° C. The mixture is stirred for an hour and a half at 120° C., and the melt is then poured into a large quantity of water. The dyestuff is precipitated by blowing air through the liquid, filtered off by suction, washed with water, dried, and freed from impurities by boiling with alcohol. The resulting dyestuff is a red powder, which dissolves to an orange-colored solution in concentrated sulfuric acid, and produces blue dyeings on cotton from a blue vat. On exposure to the air the color changes, by oxidation, to a red having a very bluish tinge. The dyestuff thus obtained probably corresponds to one of the following formulæ

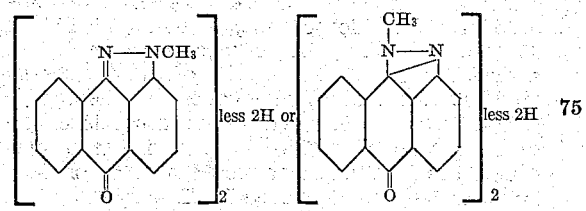

Similar dyestuffs are obtained by using the product resulting from the action of the ethyl ester of toluene sulfonic acid on pyrazolanthrone, or the product of the reaction of alkylating agents on nuclear-substituted pyrazolanthrones.

Example 2

The sodium compound of pyrazolanthrone is condensed with methylene chlorid by heating with an excess of the latter at 140 to 150° C. in an autoclave. The condensation product when crystallized from dichlorbenzene melts at 350 to 355° C. and has the composition as determined by analysis

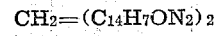

10 parts thereof are introduced at 115 to 120° C. into a melt of 100 parts of caustic potash and 100 parts of ethyl alcohol. The said temperature is maintained for a short time until the formation of the dyestuff is complete; the melt is then poured into water whereupon the dyestuff is blown out by air and worked up in the usual manner. The reaction for the formation of the dyestuff is probably illustrated by one of the following schemes:—

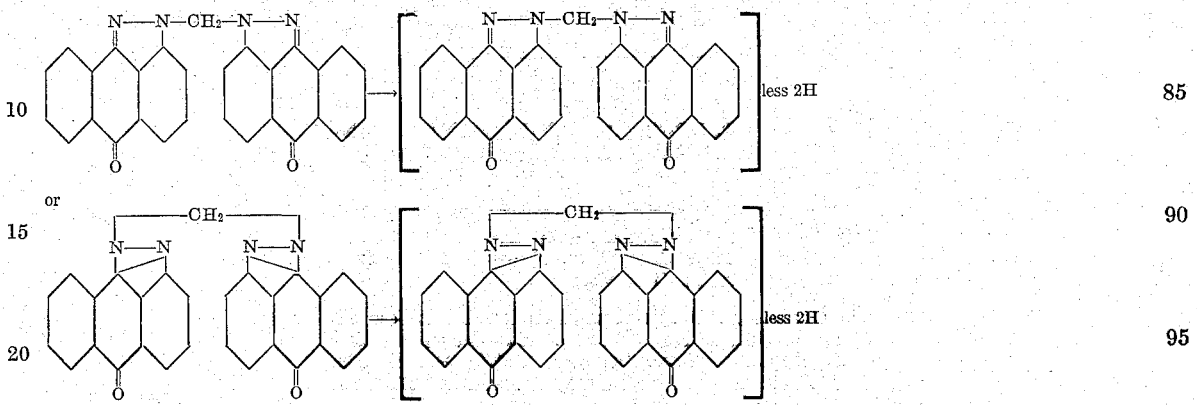

It dyes cotton from a warm blue vat blue shades which by the oxidizing action of the air turn to a pure yellow. The dyeings thus produced are very fast to chlorine and bucking. The dyestuff dissolves in concentrated sulfuric acid with a red coloration.

When employing as condensing agent a suspension of sodium anilide in aniline, the dyestuff is formed at a considerably lower temperature, for example at 30° C. In this case the product may be worked up for example by dissolving the aniline by treatment with dilute acid and separating the coloring matter from by-products by treatment with suitable solvents for example with ethyl alcohol.

Example 3

A condensation product of ethylene bromide and the sodium compound of pyrazolanthrone may be obtained by heating the said sodium compound for example with twice its weight of ethylene bromide to 140 to 150° C. When crystallized from trichlorbenzene, it melts at 364 to 368° C. 10 parts thereof are introduced into a melt consisting of 100 parts of caustic potash and 100 parts of ethyl alcohol and heated to 120 to 130° C. The said temperature is maintained for about half an hour until the formation of the dyestuff is completed, and the product is worked up as described in Example 1. The reaction probably proceeds according to one of the following schemes:—

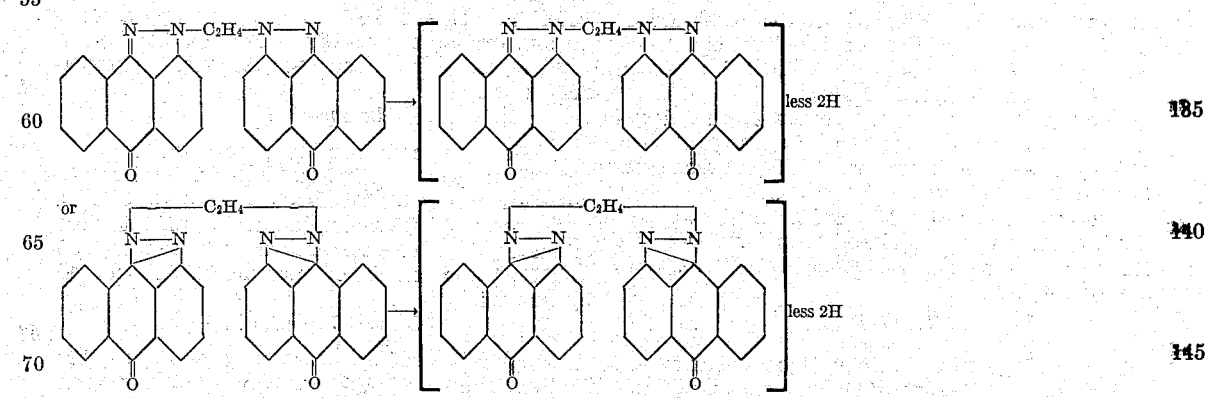

The new dyestuff dyes cotton from a warm blue vat blue shades; when exposed to the air the dyeings are converted into a very fast orange. The dyestuff dissolves in concentrated sulfuric acid with a red coloration.

The same coloring matter is obtained by heating pyrazolanthrone with ethylene glycol di-toluene sulfonic acid ester and sodium carbonate in trichlorbenzene and acting on the product so obtained as described above with a melt of alcoholic caustic potash. When employing instead of the said condensation product that obtainable from the sodium compound of pyrazolanthrone and 1.2-dibrom-propane, a vat dyestuff producing orange shades is obtained which is only little different in its properties from that described above.

We claim:

1. As new articles of manufacture vat dyestuffs of the pyrazolanthrone series producing yellow to orange dyeings, which dyestuffs are obtainable by the action of an alkaline condensing agent on an alkylene-di-pyrazolanthrone in which the alkylene radicle contains more than one carbon atom.

2. As a new article of manufacture, a vat dyestuff of the pyrazolanthrone series, which dyes cotton from a blue vat blue shades turning to a very fast orange on oxidation and dissolves in concentrated sulfuric acid with a red coloration, and which is obtainable by the action of an alkaline condensing agent on ethylene-di-pyrazolanthrone.

3. The process of producing yellow to red vat dyestuffs of the pyrazolanthrone series which comprises acting with an alkaline condensing agent on a compound selected from the group consisting of alkylene dipyrazolanthrones and the alkyl-pyrazolanthrones which can be obtained by treating a pyrazolanthrone in the presence of an acid condensing agent with an alkyl ester of an aryl-sulphonic acid.

4. The process of producing yellow to red vat dyestuffs of the pyrazolanthrone series which comprises acting with an alkaline condensing agent on an alkyl pyrazolanthrone which can be obtained by treating a pyrazolanthrone in the presence of an acid condensing agent with an alkyl ester of an aryl-sulphonic acid.

5. The process of producing yellow to red vat dyestuffs of the pyrazolanthrone series which comprises acting with an alkaline condensing agent on a compound selected from the group consisting of those alkylene dipyrazolanthrones in which the alkylene group contains up to three carbon atoms, and those alkyl-pyrazolanthrones which can be obtained by treating a pyrazolanthrone in the presence of an acid condensing agent with an alkyl ester of an aryl sulphonic acid in which the alkyl group contains up to three carbon atoms.

6. The process of producing yellow to red vat dyestuffs of the pyrazolanthrone series which comprises acting with an alkaline condensing agent on the methyl-pyrazolanthrone which can be obtained by treating pyrazolanthrone in the presence of an acid condensing agent with a methyl ester of an aryl sulphonic acid.

7. The process of producing yellow to red vat dyestuffs of the pyrazolanthrone series which comprises acting with an alkaline condensing agent on methylene-dipyrazolanthrone.

8. The process of producing yellow to red vat dyestuffs of the pyrazolanthrone series which comprises acting with an alkaline condensing agent on ethylene-dipyrazolanthrone.

PAUL NAWIASKY.
ARTUR KRAUSE.